US008441470B2

(12) United States Patent
Hibi

(10) Patent No.: US 8,441,470 B2
(45) Date of Patent: May 14, 2013

(54) COLOR SENSOR UNIT FOR USE IN DISPLAY DEVICE, COLOR MEASURING DEVICE FOR USE IN DISPLAY DEVICE, DISPLAY SYSTEM INCORPORATED WITH COLOR SENSOR UNIT, AND DISPLAY CALIBRATION METHOD

(75) Inventor: Kenichiro Hibi, Toyokawa (JP)

(73) Assignee: Konica Minolta Sensing, Inc., Osaka (JP)

( * ) Notice: Subject to any disclaimer, the term of this patent is extended or adjusted under 35 U.S.C. 154(b) by 642 days.

(21) Appl. No.: 12/319,431

(22) Filed: Jan. 5, 2009

(65) Prior Publication Data

US 2009/0179881 A1 Jul. 16, 2009

(30) Foreign Application Priority Data

Jan. 10, 2008 (JP) ................................. 2008-003560

(51) Int. Cl.
*G06F 3/038* (2006.01)
*G09G 5/00* (2006.01)
*G09G 5/10* (2006.01)
*G09G 3/36* (2006.01)

(52) U.S. Cl.
USPC ............. 345/207; 345/204; 345/690; 345/87; 345/88; 345/89; 348/180; 356/213; 445/3; 324/403

(58) Field of Classification Search .................. 345/204, 345/207, 208, 690–697, 214–215, 87–89; 356/402–425, 213–236; 324/403–414; 445/3; 348/180–194
See application file for complete search history.

(56) References Cited

U.S. PATENT DOCUMENTS 6,657,712 B2 * 12/2003 Yamaguchi .................. 356/213
2009/0251448 A1 * 10/2009 Kuwabara et al. ............ 345/207

FOREIGN PATENT DOCUMENTS

JP 2003-294528 10/2003
JP 2006-030416 2/2006
JP 2007-034209 2/2007

OTHER PUBLICATIONS

Figs. 7-9 from the present United States patent application filed Jan. 5, 2009.
Japanese Office Action dated Jun. 19, 2012 for corresponding Japanese Patent Application No. 2008-003560 with translation.

* cited by examiner

*Primary Examiner* — Bipin Shalwala
*Assistant Examiner* — Ilana Spar
(74) *Attorney, Agent, or Firm* — Brinks Hofer Gilson & Lione

(57) ABSTRACT

In a color sensor unit for use in a display device, a color measuring device for use in a display device, a display system and a display calibration method of the invention, a CPU is operable to calculate a luminance value or a chromaticity value substantially equivalent to that to be obtained by a measuring device having a light receiving angle smaller than a light receiving angle of a sensor, by correcting a luminance value or a chromaticity value measured by the sensor based on gradation information from the display device.

6 Claims, 9 Drawing Sheets

COLOR SENSOR UNIT FOR USE IN DISPLAY DEVICE, COLOR MEASURING DEVICE FOR USE IN DISPLAY DEVICE, DISPLAY SYSTEM INCORPORATED WITH COLOR SENSOR UNIT, AND DISPLAY CALIBRATION METHOD

This application is based on Japanese Patent Application No. 2008-3560 filed on Jan. 10, 2008, the contents of which are hereby incorporated by reference.

BACKGROUND OF THE INVENTION AND RELATED ART STATEMENT

1. Field of the Invention

The present invention relates to a color sensor for measuring a luminance and a chromaticity of an LCD (liquid crystal display) device in calibrating the luminance and the chromaticity of the liquid crystal display device, a display system incorporated with the color sensor, and a display calibration method.

2. Description of the Related Art

It is necessary to calibrate luminance and chromaticity variations of a high-quality monitor to be used in e.g. a printing field or a medical field. In calibrating luminance and chromaticity variations of a CRT monitor, conventionally, a compact color sensor e.g. a CRT calibrator produced by Konica Minolta may be used. The CRT calibrator is constructed in such a manner that: light from a CRT monitor is received by respective corresponding silicon photodiodes of the color sensor through XYZ color filters; the light receiving signals are stored as digital signals i.e. count values in a built-in microcomputer via a current-voltage converting circuit and an A/D conversion circuit; and a predetermined computation is performed with respect to the X-count value, the Y-count value, and the Z-count value by the microcomputer, using calibration coefficients to output a color measurement value as a final output value.

The CRT calibrator is attached to a screen of a CRT monitor via a suction disc in use. In view of this, the CRT calibrator has a small size, and a distance from the CRT screen to the color sensor is relatively short. In addition, the CRT calibrator does not have an optical system such as a lens for reducing a light receiving angle in order to suppress an increase in production cost. As a result, the color sensor has a relatively wide light receiving angle, and light in oblique direction may also be incident onto the color sensor, as well as light in forward direction.

A CRT monitor is constructed in such a manner that an area in the vicinity of a screen surface thereof is illuminated by irradiation of an electron beam, and has a relatively wide view angle. Accordingly, the luminance and the chromaticity of the CRT monitor do not greatly vary depending on an observing angle, and an influence by the wide light receiving angle i.e. the wide view angle of the color sensor is relatively small. Accordingly, the CRT calibrator is capable of precisely measuring a luminance and a chromaticity of the CRT monitor from a low luminance to a high luminance by calibrating a luminance at one predetermined point.

On the other hand, a liquid crystal display device is constructed in such a manner that a backlight device provided on a rear surface of the liquid crystal display device emits light, and liquid crystal elements provided in the vicinity of the screen surface control the light from the backlight device. In the liquid crystal display device having the above arrangement, light in lateral direction which is varied depending on an observing angle may be affected by the light receiving angle of the color sensor. FIGS. 7 and 8 are graphs respectively showing measurement results on a luminance value i.e. an LV value (see FIG. 7) and a chromaticity value i.e. an x-value and a y-value (see FIG. 8) to be obtained by changing the luminance in a state that measurement is performed by the CRT calibrator, and a one-point calibration is performed at 40 cd/m$^2$. The graphs in FIGS. 7 and 8 show error characteristics in a measurement result with respect to a reference sensor having a small light receiving angle (a spectroradiometer CS-1000 of Konica Minolta). In FIGS. 7 and 8, the axis of abscissas indicates a luminance in the unit of cd/m$^2$, and the axis of ordinate indicates an error. As is obvious from FIG. 7, a luminance error is increased, as the luminance is away from 40 cd/m$^2$ as a calibration point. Also, as is obvious from FIG. 8, a chromaticity error is sharply increased, as the luminance becomes smaller than 40 cd/m$^2$. As described above, in the case where a luminance and a chromaticity of a liquid crystal display device are measured by the CRT calibrator, the luminance and the chromaticity may not be precisely measured at a point other than the calibration point.

In view of the above, e.g. Japanese Unexamined Patent Publication No. 2003-294528 (D1) proposes a device for measuring a luminance of a liquid crystal display device. The measuring device has a contact sensor for eliminating an error resulting from a view angle variation of a liquid crystal display device, wherein a measurement result substantially equivalent to a measurement result to be obtained by a sensor of telephoto type having an optical system is obtained by converting an output from the contact sensor, with use of a conversion device such as a lookup table. In view of a point that a conversion value differs depending on the kind of a liquid crystal panel, the above measuring device has multiple conversion devices by the number of the kinds of liquid crystal panels.

The drawback on the light receiving angle may be overcome to some extent by the arrangement of the above related art. However, in the case where a luminance and a chromaticity of a liquid crystal display device are measured by visual observation, or a sensor of telephoto type having a small light receiving angle, combination of the gradation and the brightness of a backlight device may differ depending on the kinds of liquid crystal display devices, although the measurement value indicates an identical luminance value and an identical chromaticity value. For instance, there is a case that the light amount to be transmitted through a liquid crystal display device may be increased, as compared with the liquid crystal display device in a brand new state, because the backlight light amount is lowered resulting from ageing deterioration by long-time use. In this condition, in the case where the luminance and the chromaticity of the liquid crystal display device are measured by the aforementioned color sensor having a wide light receiving angle, a large error in a measurement result may be generated depending on the gradation.

FIG. 9 is a graph showing an error characteristic in a measurement result with respect to a reference sensor (a spectroradiometer CS-1000 of Konica Minolta) having a small light receiving angle, wherein measurement is performed by the CRT calibrator by changing the brightness of a backlight device of a liquid crystal display device. In FIG. 9, the axis of abscissas indicates a luminance in the unit of cd/m$^2$, and the axis of ordinate indicates an error. As is obvious from FIG. 9, even if an identical measurement value is measured at a luminance, an error may be varied depending on combination of the brightness of the backlight device and the gradation. Accordingly, in the technology disclosed in D1, it may be difficult to accurately correct a luminance/chromaticity error, even if a correction coefficient is multiplied to a measurement value.

SUMMARY OF THE INVENTION

In view of the above, it is an object of the present invention to provide a color sensor unit, for use in a display device, which enables to accurately measure a luminance value and a chromaticity value of the display device, even with use of a sensor having a wide light receiving angle, as well as a color measuring device for use in a display device, a display system incorporated with the color sensor unit, and a display calibration method.

In a color sensor unit for use in a display device, a color measuring device for use in a display device, a display system, and a display calibration method of the invention, a luminance value or a chromaticity value substantially equivalent to that to be obtained by a measuring device having a light receiving angle smaller than a light receiving angle of an optical sensor section is computed by correcting a luminance value or a chromaticity value measured by the optical sensor section, based on gradation information from the display device. Accordingly, the color sensor unit for use in a display device, the color measuring device for use in a display device, the display system, and the display calibration method of the invention enable to accurately measure a luminance value or a chromaticity value of a display device, even with use of a sensor having a wide light receiving angle.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 1:
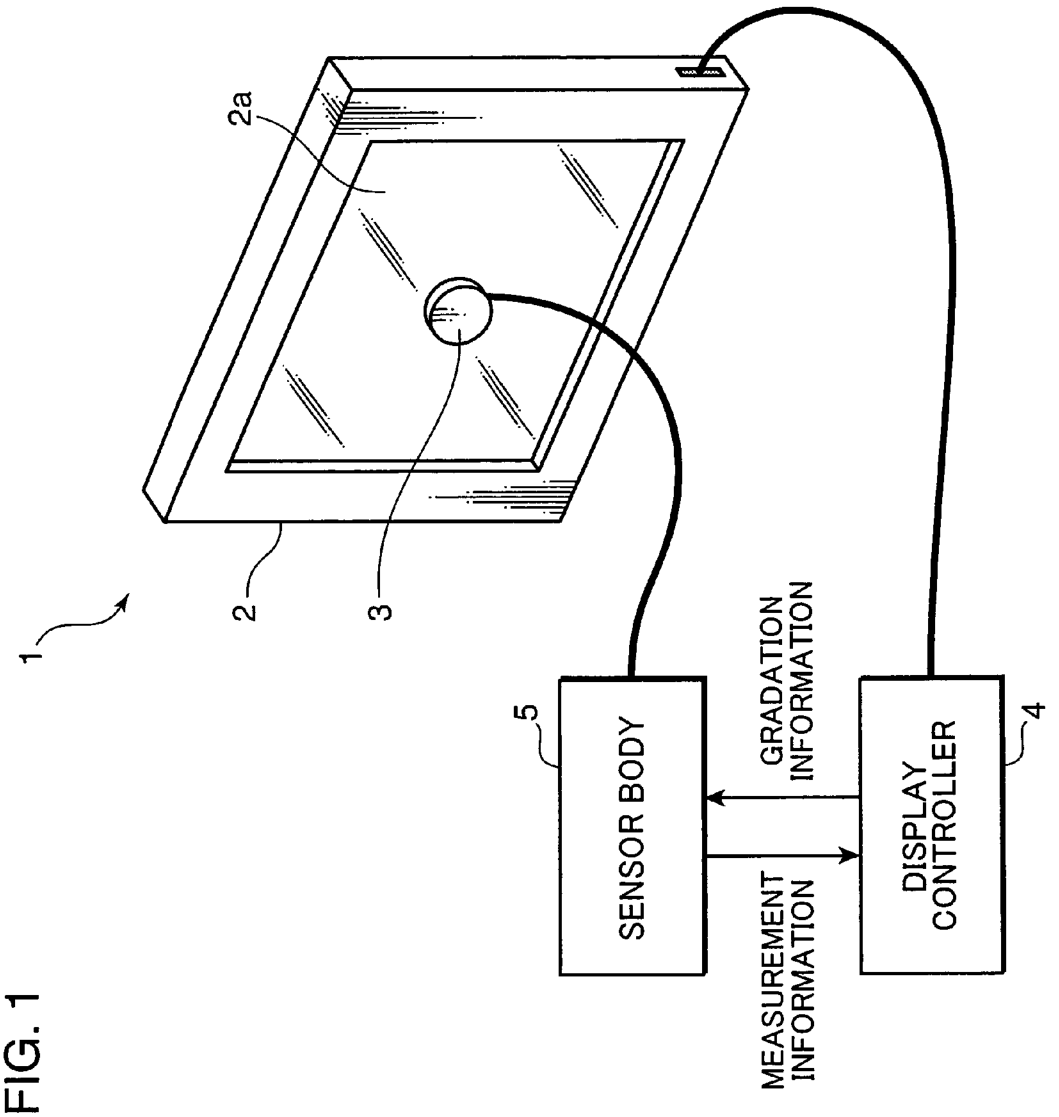
FIG. 1 is a perspective view showing an external appearance of a liquid crystal display system embodying the invention.

In the following, an embodiment of the invention is described referring to the drawings. Elements having the same reference numerals throughout the drawings indicate identical elements, and repeated description thereof is omitted, as necessary.

FIG. 1 is a perspective view showing an external appearance of a liquid crystal display system 1, as an example of a display system embodying the invention. As shown in FIG. 1, the liquid crystal display system 1 includes a high-quality liquid crystal display device 2 whose luminance and chromaticity are required to be calibrated, a display controller 4, a sensor unit 3, and a sensor body 5. The sensor unit 3 and the sensor body 5 constitute an example of a color sensor unit for use in a display device. The sensor body 5 is constituted of e.g. a personal computer. The display controller 4 is constituted of e.g. an image signal processing circuit and a computation processing circuit. Each of USB connectors or a like device is connected between the sensor unit 3 and the sensor body 5, between the liquid crystal display device 2 and the display controller 4, and between the sensor body 5 and the display controller 4. The sensor unit 3 is attached to a screen 2*a*, as a display surface, of the liquid crystal display device 2 by a suction force or a like force in performing a calibration. Alternatively, the display controller 4 and the sensor body 5 may integrally constitute a personal computer.

Figure 2:
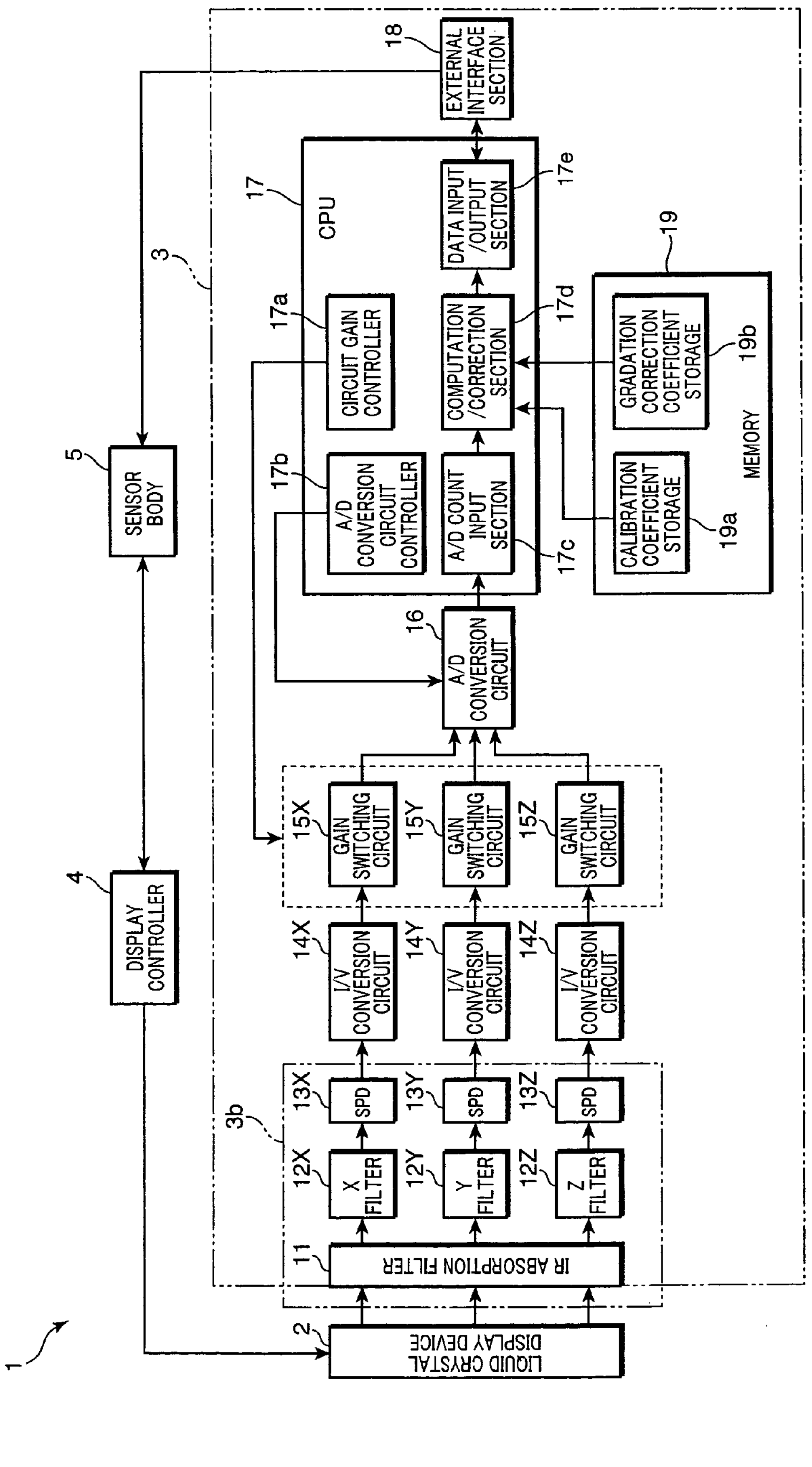
FIG. 2 is a block diagram showing an electrical configuration of a sensor unit shown in FIG. 1.

FIG. 2 is a block diagram showing an electrical configuration of the sensor unit 3 shown in FIG. 1. The sensor unit 3 includes a sensor 3*b* provided with light receiving elements. In performing a calibration, the sensor 3*b* is disposed in proximity to the screen 2*a* of the display device 2 and opposite to the screen 2*a*. The sensor 3*b* has a predetermined first light receiving angle. The sensor 3*b* is a compact and inexpensive sensor (i.e. a wide-angle sensor) having a relatively wide light receiving angle and excluding an optical lens. The first light receiving angle is defined by an optical system excluding the optical lens. The first light receiving angle may be defined by e.g. an aperture of a diaphragm. In this embodiment, the first light receiving angle is defined by e.g. a light receiving window in the sensor 3*b*. Light emitted from the screen 2*a* is incident through the light receiving window in the sensor 3*b*, and transmitted through an infrared absorption filter 11. Thereafter, the light is separated into individual light of respective wavelengths by an X filter 12X, a Y filter 12Y, and a Z filter 12Z of respective colors, and the individual light of the wavelengths is subjected to photoelectric conversion by silicon photodiodes 13X, 13Y, and 13Z, respectively.

Electric current signals obtained by the silicon photodiodes 13X, 13Y, and 13Z are converted into voltage signals by current-voltage converting circuits or I/V conversion circuits 14X, 14Y, and 14Z, respectively. Then, the voltage signals are inputted to an A/D conversion circuit 16 via gain switching circuits 15X, 15Y, and 15Z, respectively. The gain switching circuits 15X, 15Y, and 15Z are adapted to adjust the voltage signals to a dynamic range of the A/D conversion circuit 16. The A/D conversion circuit 16 analog-to-digitally converts each of the voltage signals at a predetermined cycle by a multiplexing operation. Then, a circuit gain controller 17*a* in a CPU 17 controls gains of the gain switching circuits 15X, 15Y, and 15Z individually based on the conversion result. An A/D conversion circuit controller 17*b* in the CPU 17 controls a sampling operation of the A/D conversion circuit 16. In this way, the I/V conversion circuits 14X, 14Y, 14Z, the gain switching circuits 15X, 15Y, and 15Z, and the A/D conversion circuit 16 constitute a signal converting section for converting an analog signal from the sensor 3*b* into a digital signal so that the digital signal is allowed to be processed by the CPU 17 serving as a computing section.

The CPU 17 serves as a computing section for performing computation with respect to a signal inputted from the signal converting section to obtain a luminance value i.e. an LV value, and a chromaticity value i.e. an x-value and a y-value. The CPU 17 functionally includes: an A/D count input section 17*c* to which an X-count value, a Y-count value, and a Z-count value from the A/D conversion circuit 16 are to be inputted; a computation/correction section 17*d* for obtaining a luminance value and a chromaticity value by performing computation and correction with respect to the count values, which is described later; and a data input/output section 17*e* for communicating data with the liquid crystal display device 2 via an external interface section 18, in addition to the circuit gain controller 17*a* and the A/D conversion circuit controller 17*b*.

In this embodiment, the CPU 17 is operable to obtain a luminance value or a chromaticity value substantially equivalent to that to be obtained by a measuring device for performing measurement, at a position away from the screen 2*b* of the liquid crystal display device 2, and having a second light receiving angle smaller than the first light receiving angle of the sensor 3*b*, based on an output result from the sensor 3*b*, and gradation information on the liquid crystal display device 2 which has been acquired from the display controller 4.

The second light receiving angle may be defined by e.g. an optical system having an optical lens in a non-contact color measuring device. More specifically, in this embodiment, in a process of obtaining a luminance value and a chromaticity value, the computation/correction section 17*d* in the CPU 17 is operable to multiply a correction coefficient to a computation value, based on the gradation information on the liquid crystal display device 2 which has been acquired from the display controller 4 via the data input/output section 17*e*, the external interface section 18, and the sensor body 5, by referring to a correction table stored in a memory 19 and performing an interpolation computation, as necessary.

The external interface section 18 is a communications interface for communicating data with the liquid crystal display device 2. Specifically, a computation result of the computation/correction section 17*d* is outputted to the liquid crystal display device 2 as measurement information via the external interface section 18, as well as input of the gradation information via the external interface section 18, to perform calibration of the liquid crystal display device 2; and information indicating that the liquid crystal display device 2 is in a calibration mode is transmitted from the liquid crystal display device 2 to the CPU 17 via the external interface section 18. Upon receiving the information that the liquid crystal display device 2 is in the calibration mode, the CPU 17 controls driving the signal converting section and the computing section, based on a light receiving signal from the sensor 3*b*.

In the following, computation to be performed by the CPU 17 is described in detail. The A/D count input section 17*c* in the CPU 17 acquires, from the A/D conversion circuit 16, an X-count value xcnt, a Y-count value ycnt, and a Z-count value zcnt with respect to incident light from the screen 2*a*. Likewise, the computation/correction section 17*d* in the CPU 17 acquires corresponding count values in a state that incident light is blocked by e.g. housing the sensor unit 3 in a housing vessel. Then, the count values obtained in the light blocking state are subtracted from the count values obtained with respect to the incident light. Thereby, an influence resulting from a dark current of the silicon photodiode 13X, 13Y, 13Z, and an offset value of the I/V conversion circuit 14X, 14Y, 14Z, the gain switching circuit 15X, 15Y, 15Z, and the A/D conversion circuit 16 is removed.

Then, the computation/correction section 17*d* calculates actual color measurement values Xdata, Ydata, and Zdata according to the following equations (1) through (3), based on the X-count value xcnt, the Y-count value ycnt, and the Z-count value zcnt, and using calibration coefficients a11, a12, a13; a21, a22, a23; and a31, a32, a33 derived from the aforementioned one-point calibration. In order to perform the computation, a calibration coefficient storage 19*a* in the memory 19 pre-stores the calibration coefficients a11, a12, a13; a21, a22, a23; and a31, a32, a33, which are obtained to make a measurement value to be outputted coincident with a reference value predefined by a reference light source and a reference measuring device.

$$Xdata = xcnt \times a11 + ycnt \times a12 + zcnt \times a13 \quad (1)$$

$$Ydata = xcnt \times a21 + ycnt \times a22 + zcnt \times a23 \quad (2)$$

$$Zdata = xcnt \times a31 + ycnt \times a32 + zcnt \times a33 \quad (3)$$

The calibration coefficients a11, a12, a13; a21, a22, a23; and a31, a32, a33 are determined by using e.g. a spectroradiometer, as a reference light source in a display device. Specifically, a white color (e.g. 6500K, 40 cd/$m^2$) in a certain luminance condition, and a monochromatic red color, a monochromatic green color, and a monochromatic blue color corresponding to the white color are measured. Then, the calibration coefficients a11, a12, a13; a21, a22, a23; and a31, a32, a33 are obtained by solving a matrix equation. The computation/correction section 17*d* is operable to output a luminance value and a chromaticity value in the entirety of a measurement range, by using the calibration coefficients a11, a12, a13; a21, a22, a23; and a31, a32, a33. An example of the calibration coefficients a11, a12, a13; a21, a22, a23; and a31, a32, a33 is shown in Table 1.

TABLE 1

| | a10 | a02 | a03 |
|---|---|---|---|
| a10 | 0.12204 | 0.03275 | 0.03326 |
| a20 | −0.03842 | 0.23696 | −0.00530 |
| a30 | −0.01278 | 0.02056 | 0.21544 |

In this embodiment, the computation/correction section 17*d* is operable to calculate final output values Xout, Yout, and Zout by multiplying the color measurement values Xdata, Ydata, and Zdata with correction coefficients kx, ky, and kz corresponding to the gradation information acquired from the liquid crystal display device 2, out of the correction coefficients stored in a gradation correction coefficient storage 19*b* in the memory 19 by the number of the kinds of panels of liquid crystal display devices 2, according to the equations (4) through (6).

$$Xout=Xdata\times kx \quad (4)$$

$$Yout=Ydata\times ky \quad (5)$$

$$Zout=Zdata\times kz \quad (6)$$

In the following, a method for determining the correction coefficients kx, ky, and kz is described. Basically, the sensor unit 3 and the liquid crystal display device 2 are provided in one-to-one correspondence. A change in light distribution depending on the gradation is varied among the liquid crystal panels. Accordingly, it is necessary to uniquely determine the correction coefficients kx, ky, and kz depending on the kinds of liquid crystal panels. For instance, in the case where the liquid crystal display device 2 is controlled based on 8-bits data with respect to each of the colors, the correction coefficients kx, ky, and kz are set at seven points i.e. gradations 5, 15, 27, 48, 72, 150, and 234, out of the gradations from 0 to 255. Setting the correction coefficients intensively in a low gradation range is for the following reason. As is obvious from the graph in FIG. 3, the graph is sharply curved in the low gradation range. Accordingly, it is necessary to set correction coefficients with a small interval in the low gradation range to avoid a likelihood that an error may be increased in interpolating between the adjacent gradations in the case where an error ratio is corrected. A linear interpolation or an interpolation using an approximate equation is performed with respect to a portion other than the data point i.e. a portion where data is not stored. An example of the correction coefficients kx, ky, and kz is shown in Table 2. The gradation interval or the number of gradations for use in setting the correction coefficients kx, ky, and kz may be optionally selected depending on a characteristic of the liquid crystal panel, or an intended performance of the sensor.

TABLE 2

| gradation | kx | ky | kz |
|---|---|---|---|
| 5 | 0.35309 | 0.39570 | 0.60816 |
| 15 | 0.50026 | 0.55125 | 0.73932 |
| 27 | 0.69357 | 0.71899 | 0.86321 |
| 48 | 0.85317 | 0.85797 | 0.93764 |
| 72 | 0.92992 | 0.92575 | 0.97013 |
| 150 | 1.00703 | 1.00577 | 1.00993 |
| 234 | 1.03210 | 1.03764 | 1.02870 |

Figure 3:
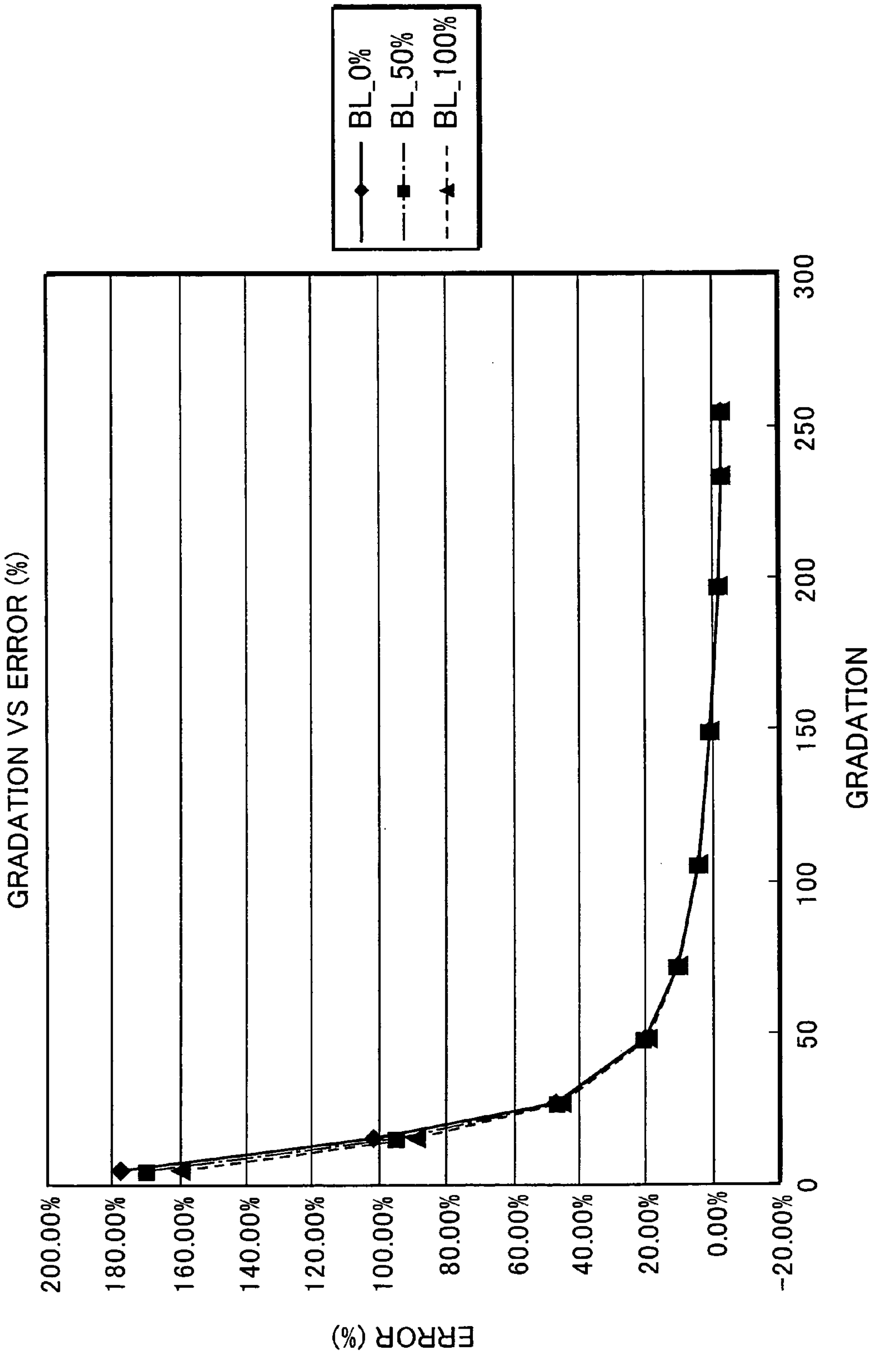
FIG. 3 is a graph showing an error characteristic in a measurement result with respect to a reference sensor having a small light receiving angle, in the case where measurement is performed by a CRT calibrator by changing the gradation of a liquid crystal display device shown in FIG. 1.
Figure 9:
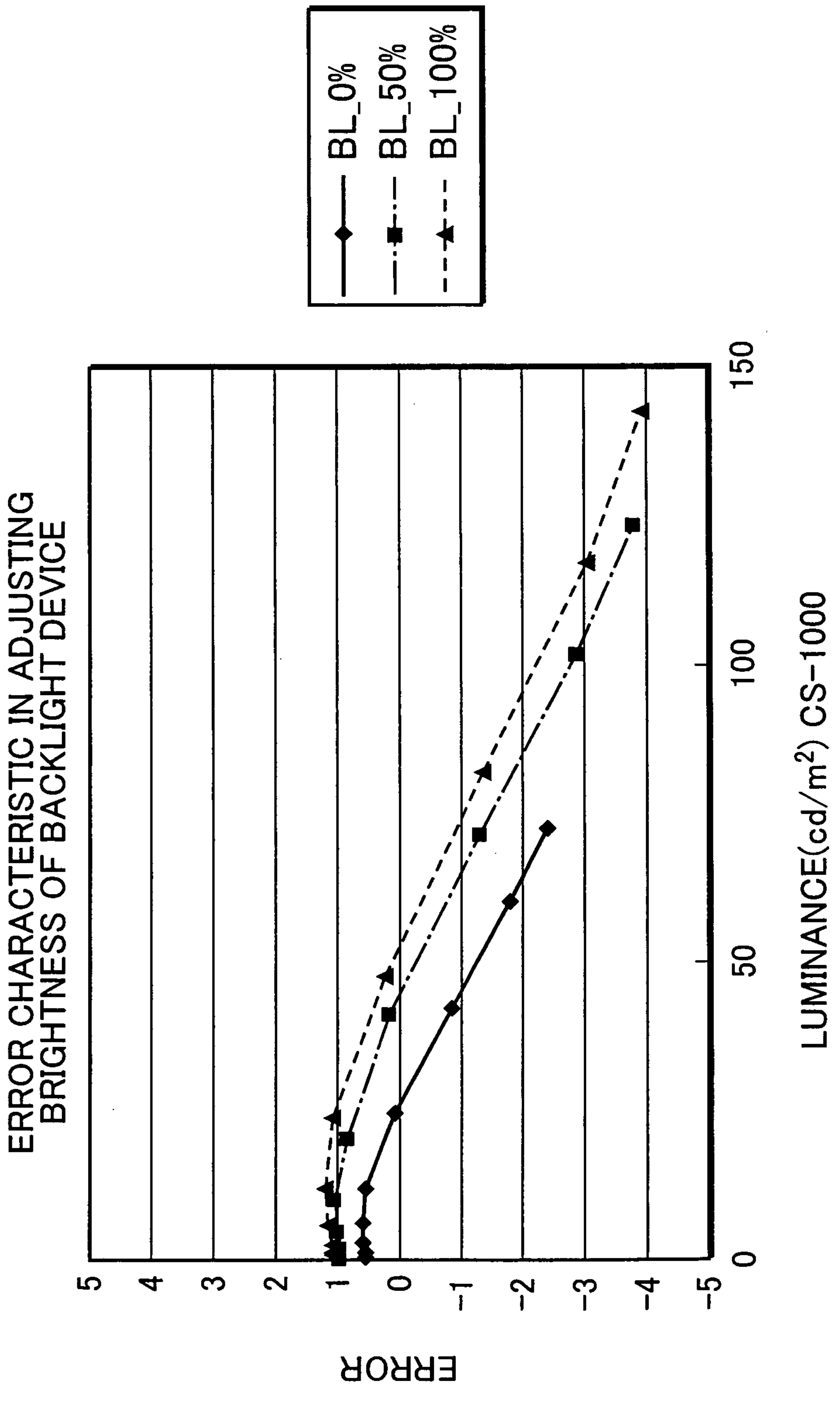
PRIOR ART FIG. 9
FIG. 9 is a graph showing an error characteristic in a measurement result with respect to the reference sensor having a small light receiving angle, in the case where measurement is performed by the conventional CRT calibrator by changing the brightness of a backlight device of the liquid crystal display device.

FIG. 3 is a graph showing a measurement result on an error amount solely depending on the gradation, without depending on the brightness of a backlight device. In FIG. 3, the axis of abscissas indicates a luminance in the unit of cd/m$^2$, and the axis of ordinate indicates an error. As is obvious from FIGS. 3 and 9, an error ratio (%) with respect to a gradation value is substantially constant, without depending on the brightness of the backlight device. In this embodiment, based on the finding on the aforementioned characteristic found by the inventor, the computation/correction section 17*d* in the CPU 17 is operable to acquire gradation information on the liquid crystal display 2 from the liquid crystal display 2, and perform correction by multiplying correction coefficients in such a manner as to cancel an error ratio depending on the gradation.

Figure 4:
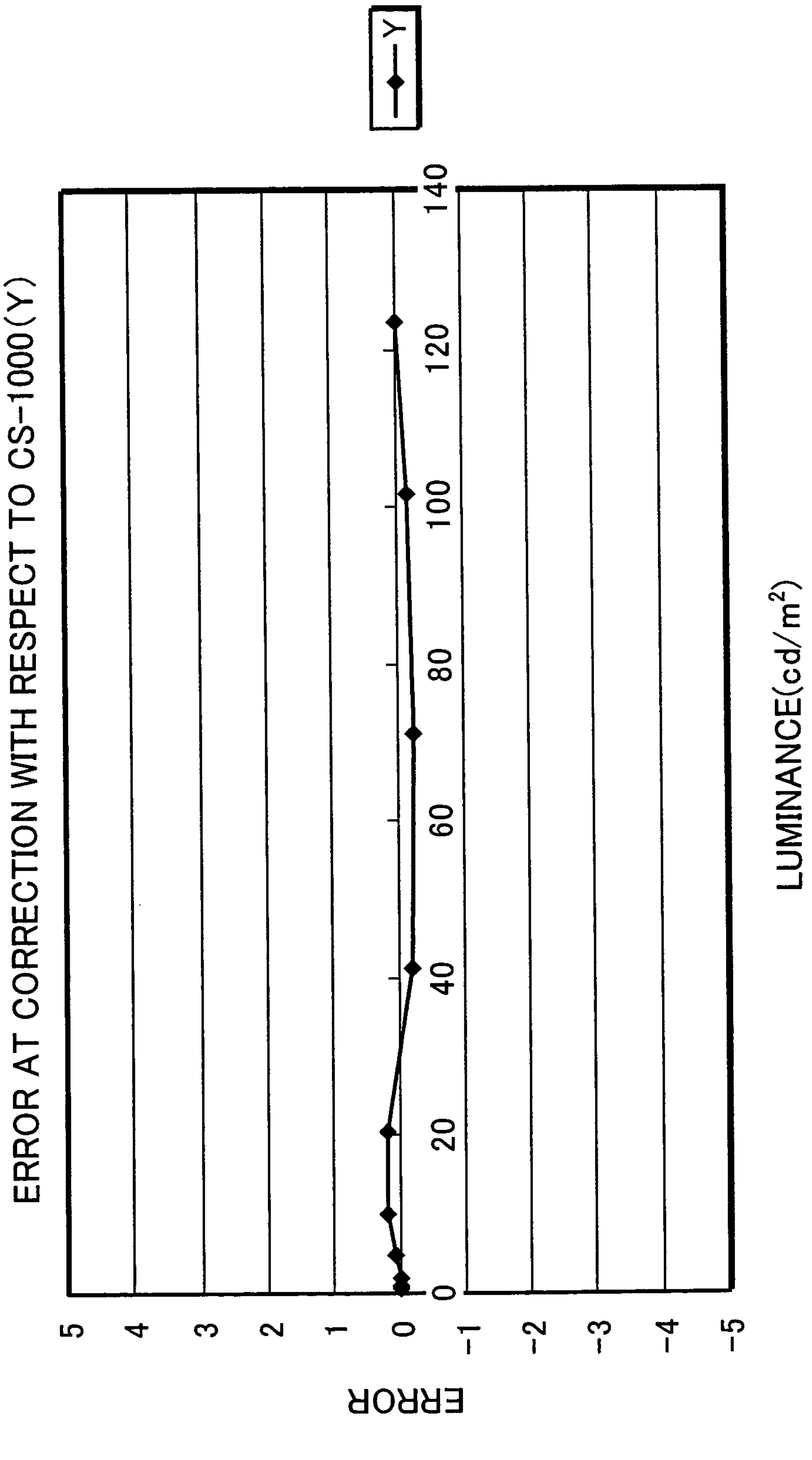
FIG. 4 is a graph showing a measurement result on a luminance value of the liquid crystal display device to be obtained by changing the luminance, in a state that measurement is performed by the CRT calibrator, and the liquid crystal display device is calibrated by a calibration method embodying the invention.
Figure 5:
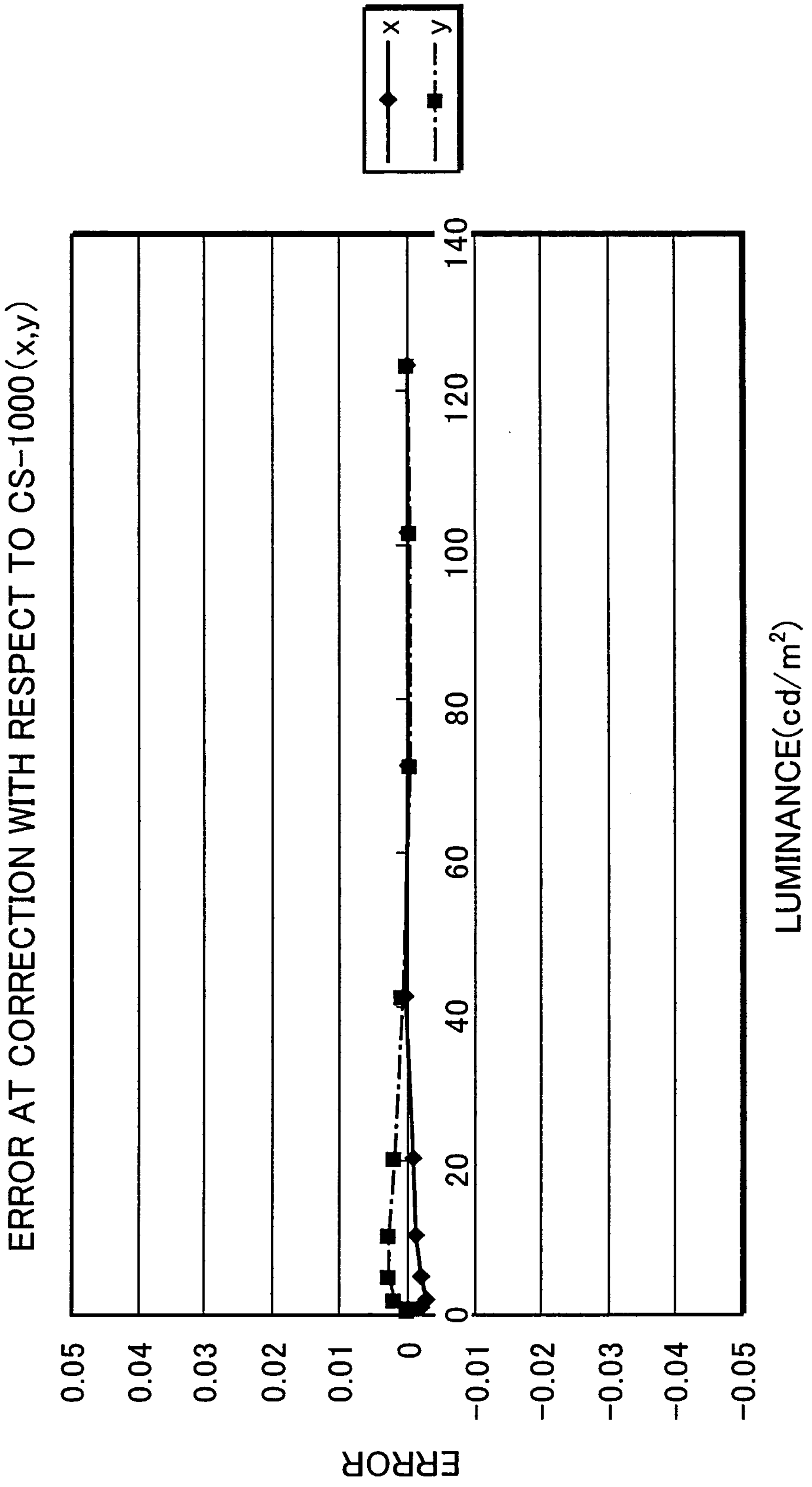
FIG. 5 is a graph showing a measurement result on a chromaticity value of the liquid crystal display device to be obtained by changing the luminance, in a state that measurement is performed by the CRT calibrator, and the liquid crystal display device is calibrated by the calibration method in the embodiment of the invention.
Figure 7:
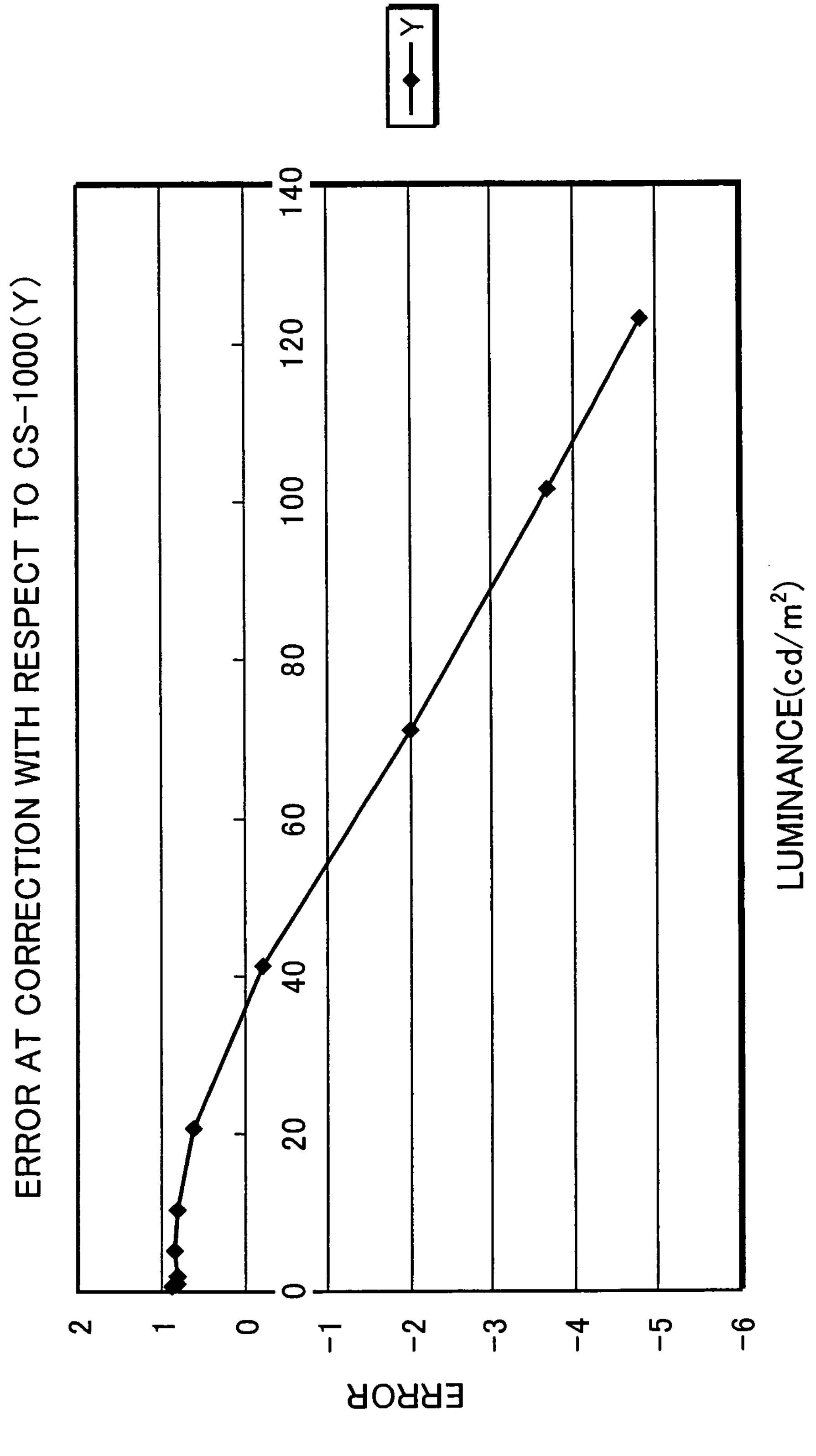
PRIOR ART FIG. 7
FIG. 7 is a graph showing an error characteristic in a measurement result with respect to a reference sensor having a small light receiving angle, in the case where a luminance value of a liquid crystal display device is measured by changing the luminance, in a state that measurement is performed by a conventional CRT calibrator, and the liquid crystal display device is calibrated.
Figure 8:
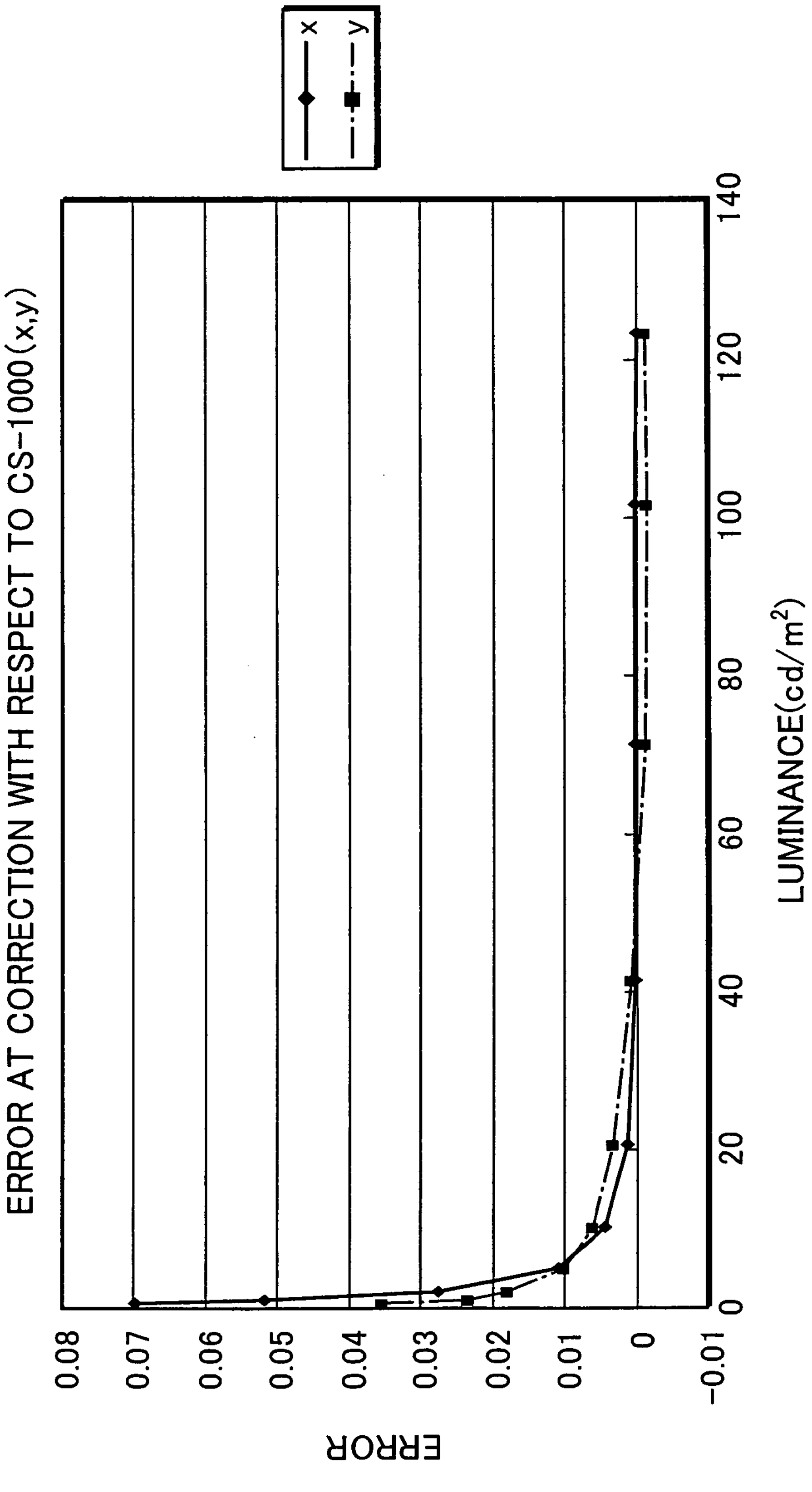
PRIOR ART FIG. 8
FIG. 8 is a graph showing an error characteristic in a measurement result with respect to the reference sensor having a small light receiving angle, in the case where a chromaticity value of a liquid crystal display device is measured by changing the luminance, in a state that measurement is performed by the conventional CRT calibrator, and the liquid crystal display device is calibrated.

FIGS. 4 and 5 are graphs showing an experiment result in the embodiment, and correspond to FIGS. 7 and 8, respectively. Specifically, FIGS. 4 and 5 are graphs respectively showing measurement results on a luminance value i.e. an LV value (see FIG. 4), and a chromaticity value i.e. an x-value and a y-value (see FIG. 5) to be obtained by changing the luminance, in a state that measurement was performed by the sensor unit 3, and a one-point calibration at 40 cd/m$^2$ was performed. The graphs in FIGS. 4 and 5 show error characteristics in a measurement result with respect to a reference sensor having a small light receiving angle (a spectroradiometer CS-1000 of Konica Minolta). In FIGS. 4 and 5, the axis of abscissa indicates a luminance in the unit of cd/m$^2$, and the axis of ordinate indicates an error. As is obvious from FIG. 4, a luminance error is suppressed not only at 40 cd/m$^2$ as a calibration point but also in the substantially entire measurement range from a low luminance to a high luminance. As is obvious from FIG. 5, a chromaticity value error is suppressed not only at 40 cd/m$^2$ but also in the substantially entire measurement range including a high luminance, although an error appears slightly in the low luminance area.

Figure 6:
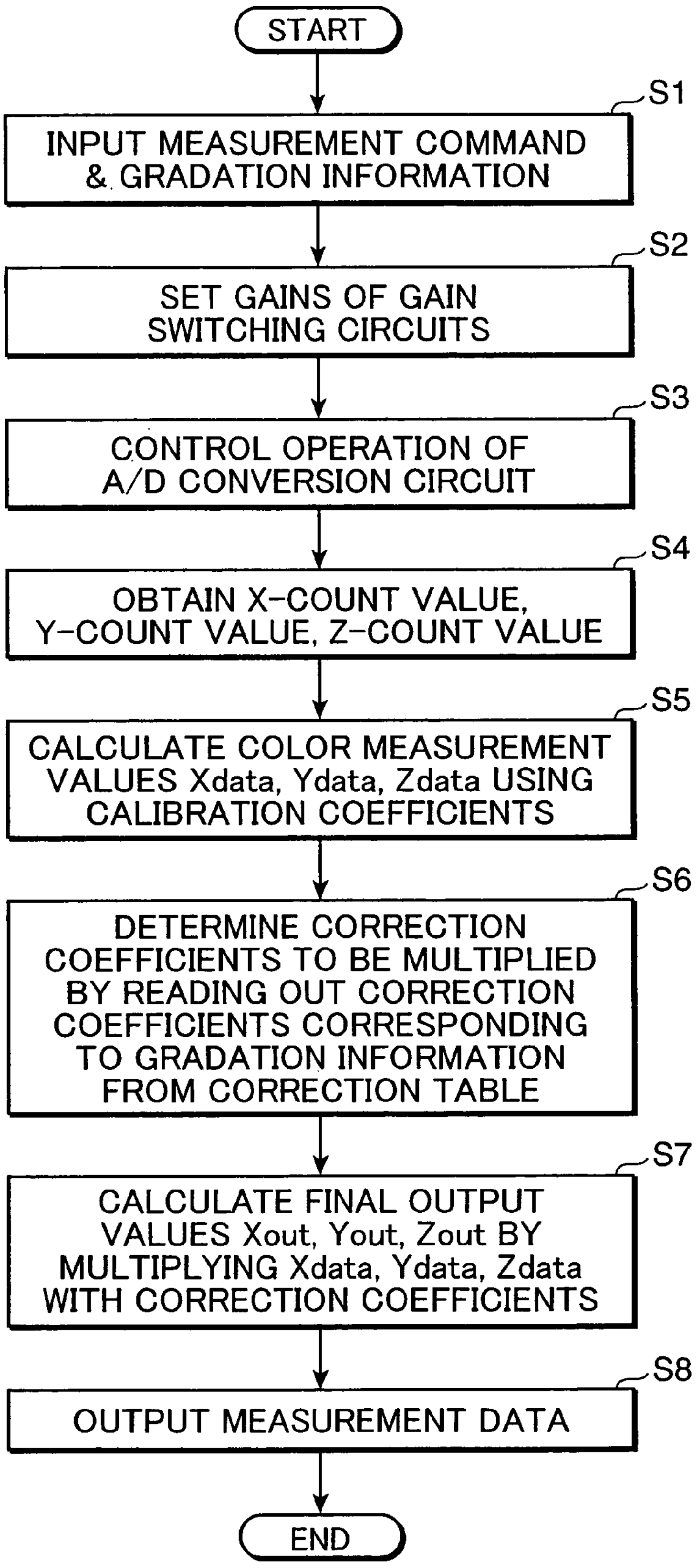
FIG. 6 is a flowchart for describing a method for measuring a luminance value and a chromaticity value in the liquid crystal display system embodying the invention.

FIG. 6 is a flowchart for describing a method for measuring a luminance value and a chromaticity value. A measurement command and current gradation information are inputted from the liquid crystal display device 2 to the computation/correction section 17*d* via the external interface section 18 and the data input/output section 17*e* (Step S1). In response to the input, the CPU 17 is brought to a measurement mode. Then, the circuit gain controller 17*a* controls the gains of the gain switching circuits 15X, 15ZY, and 15Z (Step S2). Then, the A/D conversion circuit controller 17*b* controls a sampling operation of the A/D conversion circuit 16 (Step S3). Then, the computation/correction circuit 17*d* acquires the X-count value xcnt, the Y-count value ycnt, and the Z-count value zcnt from the A/D conversion circuit 16 (Step S4).

Subsequently, the computation/correction circuit 17*d* calculates the color measurement values Xdata, Ydata, and Z data according to the equation (1) through (3), by using the count values xcnt, ycnt, and zcnt, and the calibration coefficients a11, a12, a13; a21, a22, a23; and a31, a32, a33 stored in the calibration coefficient storage 19*a* (Step S5). Then, the computation/correction section 17*d* reads out correction coefficients corresponding to the gradation information acquired from the liquid crystal display device 2, out of the correction coefficients stored in the gradation correction coefficient storage 19*b*, and obtains the correction coefficients kx, ky, and kz to be actually multiplied by e.g. performing an interpolation computation, as necessary (Step S6). Then, the computation/correction section 17*d* calculates the final output values Xout, Yout, and Zout according to the equations (4) through (6) (Step S7). Then, the final output values Xout, Yout, and Zout are transmitted from the data input/output section 17*e* to the liquid crystal display device 2 via the external interface section 18, as measurement information, to calibrate the luminance and the chromaticity of the liquid crystal display device 2 (Step S8).

As described above, the sensor unit 3 for measuring a luminance and a chromaticity of the liquid crystal display device 2 to calibrate the luminance and the chromaticity of the liquid crystal display device 2 is constructed in such a manner that a compact and inexpensive sensor (i.e. a wide-angle sensor) having a wide light receiving angle and excluding an optical lens is used as the sensor 3*b*, and the sensor 3*b* is disposed opposite to the liquid crystal display device 2. The external interface section 18 is adapted to acquire gradation information from the liquid crystal display device 2. The computation/correction section 17*d* in the CPU 17, as a correcting section, is operable to correct a measurement result of the sensor 3*b*, based on the gradation information to obtain a luminance value and a chromaticity value substantially equivalent to those to be obtained by a sensor (telephoto sensor) having a small light receiving angle, in place of obtaining a luminance value and a chromaticity value simply based on the measurement result of the sensor 3*b*. This enables to accurately measure a luminance value and a chromaticity value of the liquid crystal display device 2, substantially equivalent to those to be measured by a sensor having a small light receiving angle i.e. a general spectroradiometer, without an influence of a change in light receiving angle depending on the gradation, which is inherent to a liquid crystal display device; and accurately calibrate the luminance and the chromaticity of the liquid crystal display device 2.

The specification discloses the aforementioned various techniques. The following is a summary of the primary techniques.

A color sensor unit according to an aspect of the invention is a color sensor unit, for use in a display device, for calibrating a luminance or a chromaticity of the display device. The color sensor unit includes: an optical sensor section disposed in proximity to a display surface of the display device, and having a predetermined light receiving angle; an input section for acquiring gradation information from the display device; and a correcting section for obtaining a luminance value or a chromaticity value substantially equivalent to a luminance value or a chromaticity value to be obtained by a measuring device having a light receiving angle smaller than the light receiving angle of the optical sensor section, based on an output result from the optical sensor section, and the gradation information acquired by the input section, the measuring device being adapted to perform measurement at a position away from the display surface of the display device.

A calibration method according to another aspect of the invention is a method for calibrating a luminance or a chromaticity of a display device. The calibration method includes: a step of measuring data indicating a luminance value or a chromaticity value by an optical sensor section disposed in proximity to a display surface of the display device and having a predetermined light receiving angle; a step of acquiring gradation information from the display device by an input section; and a step of obtaining a luminance value or a chromaticity value substantially equivalent to a luminance value or a chromaticity value to be obtained by a measuring device having a light receiving angle smaller than the light receiving angle of the optical sensor section by a correcting section, based on the data measured by the optical sensor section, and the gradation information acquired by the input section, the measuring device being adapted to perform measurement at a position away from the display surface of the display device.

The color sensor unit and the calibration method having the above arrangements, particularly, a color sensor unit and a calibration method for measuring a luminance and a chromaticity of a liquid crystal display device to calibrate the luminance and the chromaticity of the liquid crystal display device are configured as follows. A compact and inexpensive sensor (wide-angle sensor) having a wide light receiving angle and excluding an optical lens is disposed in proximity to the display device in use. The input section is operable to acquire the gradation information from the display device. The correcting section is operable to correct a measurement result of the sensor based on the gradation information acquired by the input section, in place of obtaining a luminance value and a chromaticity value simply based on the measurement result of the sensor. Thereby, the correcting section is operable to obtain the luminance value or the chromaticity value substantially equivalent to that to be obtained by the measuring device for performing measurement, at the position away from the display surface of the display device, and having the light receiving angle smaller than the light receiving angle of the optical sensor section (e.g. a luminance value or a chromaticity value substantially equivalent to that to be obtained by a sensor (telephoto sensor) having a small light receiving angle). The inventor obtained, by an experiment, a finding that an error by the sensor (wide-angle sensor) having the wide light receiving angle with respect to a sensor (telephoto sensor) having a small light receiving angle is varied depending on the gradation, without depending on the brightness of a backlight device of a display device.

In the above arrangements, even with use of a sensor having a wide light receiving angle, correcting a measurement result depending on the actual gradation of a liquid crystal display device by e.g. multiplying a correction coefficient in such a manner as to cancel an error ratio depending on the gradation, enables to accurately measure a luminance value and a chromaticity value of the display device, substantially equivalent to those to be measured by a sensor having a small light receiving angle e.g. a general spectroradiometer, without an influence of a change in light receiving angle depending on the gradation, which is inherent to a liquid crystal display device; and accurately calibrate the luminance and the chromaticity of the display device.

A display system according to yet another aspect of the invention is a display system including a display device and the aforementioned color sensor unit to be connected to the display device, wherein the display device includes an output section for outputting the gradation information, and a calibrating section for calibrating the luminance or the chromaticity of the display device, based on the luminance value or the chromaticity value obtained by the correcting section.

Even with use of a compact and inexpensive sensor having a wide light receiving angle and excluding an optical lens, the display system having the above arrangement enables to accurately measure a luminance value and a chromaticity value of the display device, substantially equivalent to those to be measured by a sensor having a small light receiving angle e.g. a general spectroradiometer, without an influence of a change in light receiving angle depending on the gradation, which is inherent to a liquid crystal display device; and accurately calibrate the luminance and the chromaticity of the display device.

A color measuring device according to still another aspect of the invention is a color measuring device for use in a display device. The color measuring device includes: an optical sensor section, disposed in contact with the display device, for receiving light from the display device at a first light receiving angle; an input section for acquiring gradation information from the display device; and a correcting section for obtaining a luminance value or a chromaticity value substantially equivalent to a luminance value or a chromaticity value to be obtained by measuring at a second light receiving angle different from the first light receiving angle, based on an output result from the optical sensor section and the gradation information acquired by the input section.

In the color measuring device, preferably, the first light receiving angle may be defined by an optical system excluding an optical lens, and the second light receiving angle may be defined by an optical system including an optical lens in a non-contact measuring device, the second light receiving angle being smaller than the first light receiving angle.

The color measuring device having the above arrangement enables to accurately measure a luminance value and a chromaticity value of the display device, substantially equivalent to those to be measured by a sensor having a small light receiving angle e.g. a non-contact color measuring device, without an influence of a change in light receiving angle depending on the gradation, which is inherent to a liquid crystal display device; and accurately calibrate the luminance and the chromaticity of the display device.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A color sensor unit for use in a display device for calibrating a luminance or a chromaticity of the display device using a contact-type optical sensor, the calibrating based on gradation correction information previously obtained using a telescopic-type optical sensor, the color sensor unit comprising:

a) a contact-type optical sensor section disposed in proximity to a display surface of the display device, and having a first predetermined light receiving angle;

b) the telescopic-type optical sensor having a second predetermined light receiving angle smaller than the first predetermined light receiving angle of the contact-type optical sensor;

c) a gradation correction generation section, comprising:

c1) an input section electrically connected with an output section of the display device, and configured to receive drive signals from the display device, the received drive signals corresponding to a plurality of gradation levels output by the display, independent of a backlighting level of the display device;

c2) the input section configured to acquire, using the telescopic-type optical sensor, luminance and chromaticity values acquired at the plurality of different gradation drive levels;

c3) a calibration section configured to obtain luminance or chromaticity values from the display device using the contact-type optical sensor based on the plurality of different drive levels provided by the display device, and configured to generate a plurality of gradation correction coefficients based on the luminance or chromaticity values obtained by the telescopic-type optical sensor and the contact-type optical sensor;

d) a storage section configured to store the generated plurality of gradation correction coefficients corresponding to the plurality of different drive levels provided by the display device;

e) a correcting section configured to correct the luminance value or the chromaticity value obtained by the contact-based optical sensor by applying the gradation correction coefficients to the luminance value or chromaticity value; and wherein the corrected luminance or chromaticity values obtained by the contact-type optical sensor are substantially equivalent to empirical luminance or chromaticity values that would be obtained by a telescopic-type optical sensor.

2. A color measuring device for use in a display device, comprising:

a contact-type optical sensor section, disposed in contact with the display device and configured to receive light from the display device at a first light receiving angle;

a telescopic-type optical sensor section having a second predetermined light receiving angle smaller than the first predetermined light receiving angle of the contact-type optical sensor section;

an input section operatively coupled with an output section of the display device, and configured to acquire a gradation measurement value output by the display device said gradation measurement value acquired independent of a backlighting level of the display device;

a storage section configured to store a plurality of gradation correction coefficients corresponding to the acquired gradation measurement value and indicating a correspondence between the luminance or chromaticity values obtained at the second predetermined light receiving angle from the telescopic-type optical sensor section relative to the luminance or chromaticity values obtained at the first predetermined light receiving angle from the contact-type optical sensor section;

a correcting section for obtaining the luminance or chromaticity values based only on an output result from the contact-type optical sensor section, the luminance or chromaticity values being corrected using the gradation correction coefficients stored in the storage section so that the luminance or chromaticity values obtained only from the contact-type optical sensor section are substantially equivalent to luminance or chromaticity values that would be obtained by the telescopic-type optical sensor section; and wherein the gradation correction coefficients are independent of a backlighting level of the display device.

3. The color measuring device according to claim 2, wherein the first light receiving angle is defined by an optical system excluding an optical lens, and the second light receiving angle is defined by an optical system including an optical lens in a non-contact measuring device, the second light receiving angle being smaller than the first light receiving angle.

4. A method for calibrating a luminance or a chromaticity of a display device, comprising:

measuring data indicating a luminance value or a chromaticity value, by a contact-type optical sensor section disposed in proximity with a display surface of the display device, and having a predetermined light receiving angle;

acquiring gradation information output by the display device, through an input section operatively coupled to an output of the display device, to acquire gradation information independent of a backlighting level of the display device;

storing a plurality of gradation correction coefficients corresponding to a plurality of acquired gradation information output by the display device;

correcting, by a correcting section, the luminance value or the chromaticity value obtained from the contact-type optical sensor section so that the luminance value or the chromaticity value obtained only from the contact-type optical sensor section is substantially equivalent to an empirical luminance value or a chromaticity value that would be obtained by a telescopic-type optical sensor having a light receiving angle smaller than the predetermined light receiving angle of the contact-type optical sensor section, the corrected luminance value or chromaticity value being corrected based on the gradation correction coefficient in a storage section, the gradation correction coefficient selected based on the gradation information.

5. A color sensor unit, for use in a display device for calibrating a luminance or chromaticity of the display device, the color sensor unit comprising:

a contact-type optical sensor section disposed in proximity to a display surface of the display device, and having a first predetermined light receiving angle;

an input section operatively coupled to an output section of the display device, and configured to acquire a gradation measurement value output by the display device through an interface between the color sensor unit and the display device, said gradation measurement value obtained independent of a backlighting level of the display device;

a storage section configured to store a plurality of gradation correction coefficients corresponding to the acquired gradation measurement value output by the display device;

a correcting section configured to obtain and correct the luminance value or the chromaticity value obtained only from the contact-type optical sensor section so that the luminance value or the chromaticity value obtained only from the contact-type optical sensor section is substantially equivalent to an empirical luminance value or chromaticity value that would be obtained by a telescopic-type optical sensor having a second predetermined light receiving angle smaller than the first predetermined light receiving angle of the contact-type optical sensor section; and wherein the luminance value or the chromaticity value obtained from the contact-type optical sensor section being corrected based on the gradation correction coefficients stored in the storage section, the gradation correction coefficients selected based on the gradation measurement value, and wherein the gradation correction coefficients are independent of a backlighting level of the display.

6. A color sensor unit, for use in a liquid crystal display device including a backlight device for calibrating a luminance or a chromaticity of the liquid crystal display device, the color sensor unit comprising:

a contact-type optical sensor section disposed in proximity to a display surface of the liquid crystal display device, and having a first predetermined light receiving angle;

an input section operatively coupled to the liquid crystal display device, and configured to acquire a gradation measurement value output by the liquid crystal display, said gradation measurement value being independent of a backlighting level of the backlight device;

a storage section configured to store a plurality of gradation correction coefficients corresponding to the acquired gradation measurement value output by the liquid crystal display device;

a correcting section configured to obtain and correct the luminance value or the chromaticity value obtained only from the contact-type optical sensor section so that the luminance value or the chromaticity value obtained only from the contact-type optical sensor section is substantially equivalent to empirical luminance or chromaticity values to be obtained by a telescopic-type optical sensor having a second predetermined light receiving angle smaller than the first predetermined light receiving angle of the contact-type optical sensor section; and wherein the luminance value or the chromaticity value obtained from the contact-type optical sensor section being corrected based on gradation correction coefficients stored in a storage section, the gradation correction coefficients selected based on the gradation measurement value output by the liquid crystal display device, wherein the gradation correction coefficients are independent of a backlighting level of the display.

* * * * *